(12) United States Patent
Hsieh

(10) Patent No.: US 7,390,548 B2
(45) Date of Patent: Jun. 24, 2008

(54) OPTICAL INFORMATION STORAGE MEDIUM

(75) Inventor: Kuo-Ching Hsieh, Taipei Hsien (TW)

(73) Assignee: Prodisc Technology Inc., Taipei Hsien (TW)

( * ) Notice: Subject to any disclaimer, the term of this patent is extended or adjusted under 35 U.S.C. 154(b) by 584 days.

(21) Appl. No.: 11/130,205

(22) Filed: May 17, 2005

(65) Prior Publication Data

US 2006/0210758 A1    Sep. 21, 2006

(30) Foreign Application Priority Data

Mar. 21, 2005    (TW) .............................. 94108686 A

(51) Int. Cl.
*B32B 3/02*    (2006.01)

(52) U.S. Cl. .................. 428/64.1; 428/64.4; 430/270.11

(58) Field of Classification Search ................ 428/64.1, 428/64.4; 430/270.12
See application file for complete search history.

(56) References Cited

U.S. PATENT DOCUMENTS 5,686,178 A * 11/1997 Stevens et al. .............. 428/336
6,017,628 A *  1/2000 Stevens et al. .............. 428/381
6,231,653 B1 * 5/2001 Lavery et al. ............ 106/31.36

* cited by examiner

*Primary Examiner*—Elizabeth Mulvaney
(74) *Attorney, Agent, or Firm*—Birch, Stewart, Kolasch & Birch, LLP

(57) ABSTRACT

An optical information storage medium includes a first substrate, a reflective layer and a second substrate. In this case, the reflective layer is disposed above the first substrate. The second substrate is disposed above the reflective layer. The material of the second substrate is sucrose.

18 Claims, 2 Drawing Sheets

OPTICAL INFORMATION STORAGE MEDIUM

BACKGROUND OF THE INVENTION

1. Field of Invention

The present invention relates to an information storage medium and, in particular, to an optical information storage medium.

2. Related Art

Accompany to the progress of technology and multimedia, the format of data have been not only still image but also animation. Facing to storage requirement of a great amount of digital audio and video information, there are many optical information storage mediums with high storage capacity could be applied to electronic products, such as compact disc (CD), digital video disc (DVD), blue-ray disc (BD), high definition DVD (HD-DVD).

Conventional substrate of the optical information storage medium is made of polycarbonate (PC). DVD includes a first substrate and a second substrate. By pressing a disc stamper onto the first substrate, that will transfer patterns to the first substrate and form a plurality of different size of pits (or grooves) and lands thereon as data read out by laser beam. The second substrate is a reinforced sheet with no data on it. In prior art, the first substrate and the second substrate are all made of PC. There will be 10 billion pieces of disc being cast-off. These disc made by PC could not be self-dissolved and be reused, they will induce environmental pollutions. Besides, burning the disc will release poisonous gases and cause air pollution. Therefore, how to provide an optical information storage medium with low pollution to environment has been an essential target.

SUMMARY OF THE INVENTION

In view of the foregoing, the present invention is to provide an optical information storage medium with low pollution to environment.

To achieve the above, an optical information storage medium according to the present invention includes a first substrate, a reflective layer and a second substrate. In the present invention, the reflective layer is disposed above the first substrate. The second substrate is disposed above the reflective layer. The material of the second substrate is sucrose.

To achieve the above, an optical information storage medium according to the present invention includes a substrate and a reflective layer. In the present invention, the material of the substrate is sucrose and the reflective layer is disposed above the substrate.

As mentioned above, the substrate of an optical information storage medium according to the present invention is made of sucrose. Comparing with the prior art, an optical information storage medium according to the present invention could be naturally dissolved and induce low pollution to environment.

BRIEF DESCRIPTION OF THE DRAWINGS

The present invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements. An optical information storage medium according to the present invention may be read-only CD (CD-ROM), write-once CD (CD-R), rewritable CD (CD-RW), read-only DVD (DVD-ROM), write-once DVD (DVD+/−R), rewritable DVD (DVD+/−RW), random-access DVD (DVD-RAM), blue-ray disc (BD), high definition DVD (HD-DVD) or any other optical information storage medium.

Figure 1:
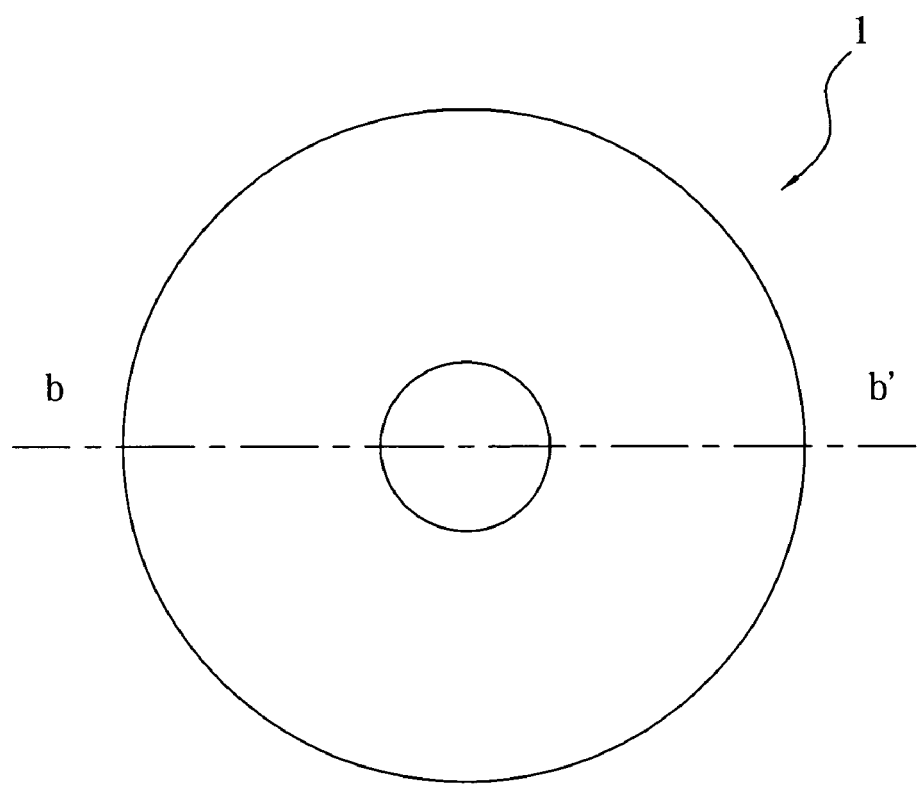
FIG. 1 is a top view showing one embodiment of an optical information storage medium according to the present invention.
Figure 2:
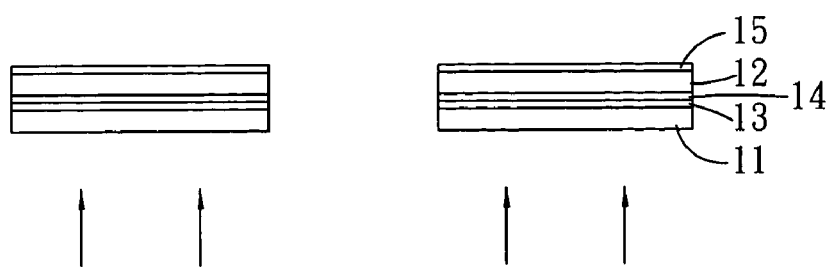
FIG. 2 is a cross-sectional view of dashed line b-b' in FIG. 1.

In this embodiment, as shown in FIGS. 1 and 2, an optical information storage medium 1 is write-once CD (CD-R) and includes a first substrate 11, a second substrate 12, a recording layer 13, a reflective layer 14 and a printing layer 15.

The material of the first substrate 11 is a plastic, for example acrylic, polycarbonate (PC) or acrylonitrile-butadiene-styrene (ABS). The first substrate 11 is formed by injection molding of PC onto a disc stamper with pits and grooves. Then, spin-coating a dye on the first substrate 11 to form the recording layer 13. The reflective layer 14 is formed by sputtering silver or silver alloy on the recording layer 13. In this embodiment, the first substrate 11 may be made of sucrose. After melting sucrose to be liquid state, then being injection molding to form the first substrate 11.

In this embodiment, the material of the second substrate 12 may be sucrose of chemical formula $C_{12}H_{22}O_{11}$. After melting sucrose to be liquid state, then being injection molding to form the second substrate 12 and disposing the second substrate 12 above the reflective layer 14. It may further dispose a film, for example transparent polymer or metal, outside the second substrate 12 to enhance the anti-moisture effect. Furthermore, the printing layer 15 disposed on the second substrate 12 may further avoid moisture penetrating into sucrose.

In this embodiment, when reading out data stored in the optical information storage medium 1, the storage medium 1 is placed into a disc drive. Optical beam emitted from pick-up head (as arrows shown in FIG. 2) will pass through the transparent first substrate 11 for reading out, writing in or erasing data stored in the storage medium. It is well known operation for the persons skilled in the art, so would not be described in detail.

Figure 3:
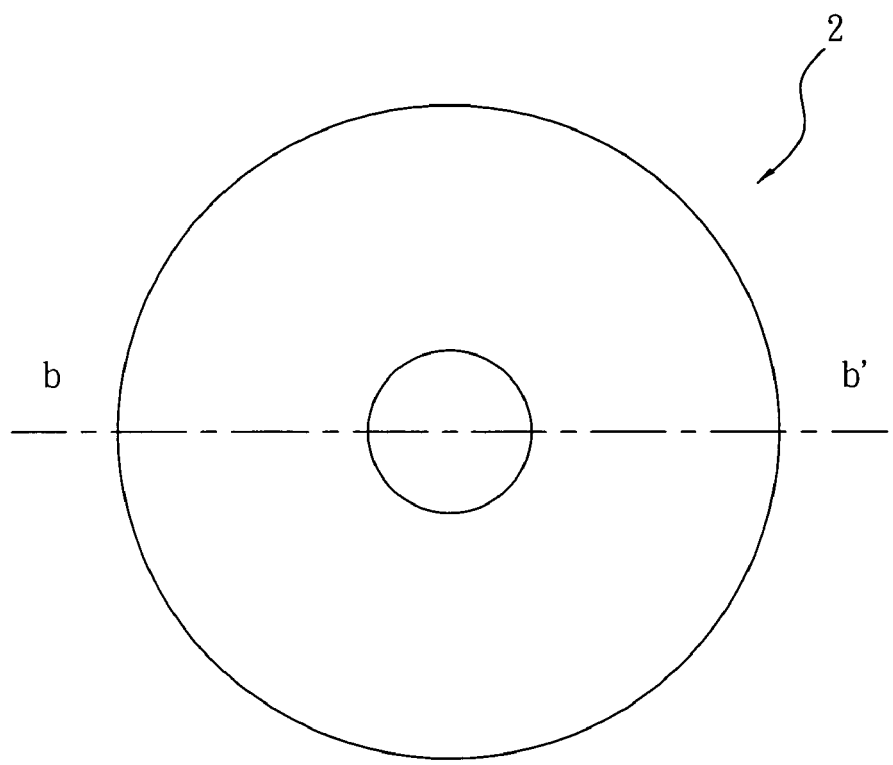
FIG. 3 is a top view showing another embodiment of an optical information storage medium according to the present invention.
Figure 4:
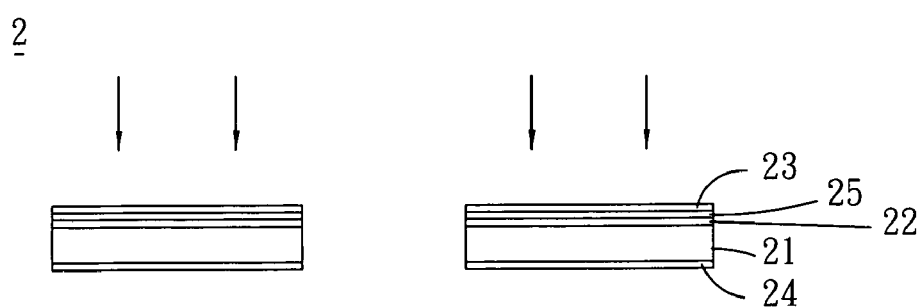
FIG. 4 is a cross-sectional view of dashed line b-b' in FIG. 3.

In another embodiment, as shown in FIGS. 3 and 4, an optical information storage medium 2 is blue-ray disc (BD) and includes a substrate 21, a reflective layer 22, a cover layer 23 and a printing layer 24.

In this embodiment, the substrate 21 may be made of sucrose. After melting sucrose to be liquid state, then being injection molding to form the substrate 21. Generally speaking, the thickness of the substrate 21 of BD is about 1.1 mm. The reflective layer 22 is made of metal, for example Au, Al, Ag or any other metal, and is disposed above the substrate 21.

In this embodiment, the cover layer 23 is disposed above the reflective layer 22. The cover layer 23 may be made of transparent material or sucrose, and the thickness of the cover layer 23 is about 0.1 mm.

A recording layer 25 for recording data may further be disposed between the reflective layer 22 and the cover layer 23. The printing layer 24 is disposed on the substrate 21 opposite to the side with the reflective layer 22 for avoiding the influence from moisture. Furthermore, it may further dispose a film, for example transparent polymer or metal, outside the substrate 21 to enhance the anti-moisture effect.

When user would like to read out data stored in the optical information storage medium 2, the storage medium 2 is placed into a disc drive. Optical beam emitted from pick-up head (as arrows shown in FIG. 4) will pass through the cover layer 23 for reading out, writing in or erasing data stored in the optical information storage medium 2.

In summary, the substrate of an optical information storage medium according to the present invention is made of sucrose. Comparing with the prior art, an optical information storage medium according to the present invention could be naturally dissolved and induce low pollution to environment. Due to the hardness of sucrose is higher than the hardness of PC, an optical information storage medium according to the present invention will have better mechanical characteristics and reduce the tilt issue of the surface of the substrate or substrate bending issue.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An optical information storage medium, comprising:
   a first substrate;
   a reflective layer, disposed above the first substrate; and
   a second substrate, disposed above the reflective layer and the material of the second substrate is sucrose.

2. An optical information storage medium according to claim 1, further comprising
   a printing layer, disposed above the second substrate.

3. An optical information storage medium according to claim 1, further comprising
   a film, disposed outside the second substrate.

4. An optical information storage medium according to claim 3, wherein the material of the film is a transparent polymer or a metal.

5. An optical information storage medium according to claim 1, further comprising
   a recording layer, disposed between the first substrate and the reflective layer.

6. An optical information storage medium according to claim 5, wherein an optical beam pass through the first substrate for reading out, writing in or erasing data stored in the storage medium.

7. An optical information storage medium according to claim 1, wherein the material of the first substrate comprises sucrose.

8. An optical information storage medium according to claim 1, wherein the storage medium is a read-only DVD (DVD-ROM), a write-once DVD (DVD+/−R), a rewritable DVD (DVD+/−RW), a random-access DVD (DVD-RAM) or a high definition DVD (HD-DVD).

9. An optical information storage medium, comprising:
   a substrate, the material of the substrate is sucrose; and
   a reflective layer, disposed above the substrate.

10. An optical information storage medium according to claim 9, further comprising
    a cover layer, disposed above the reflective layer.

11. An optical information storage medium according to claim 9, further comprising
    a printing layer, disposed above the substrate opposite to the side with the reflective layer.

12. An optical information storage medium according to claim 9, further comprising
    a film, disposed outside the substrate.

13. An optical information storage medium according to claim 12, wherein the material of the film is a transparent polymer or a metal.

14. An optical information storage medium according to claim 10, further comprising a recording layer, disposed between the cover layer and the reflective layer.

15. An optical information storage medium according to claim 14, wherein an optical beam pass through the cover layer for reading out, writing in or erasing data stored in the storage medium.

16. An optical information storage medium according to claim 10, wherein the material of the cover layer comprises sucrose.

17. An optical information storage medium according to claim 9, wherein the storage medium is a read-only CD (CD-ROM), a write-once CD (CD-R), a rewritable CD (CD-RW) or a blue-ray disc (BD).

18. An optical information storage medium according to claim 10, wherein an optical beam pass through the cover layer for reading out data stored in the storage medium.

* * * * *